United States Patent
Mowatt

(10) Patent No.: US 10,552,430 B2
(45) Date of Patent: Feb. 4, 2020

(54) INCREASING UTILIZATION OF A COMPUTER SYSTEM

(71) Applicant: Microsoft Technology Licensing, LLC, Redmond, WA (US)

(72) Inventor: David Mowatt, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 483 days.

(21) Appl. No.: 15/407,670

(22) Filed: Jan. 17, 2017

(65) Prior Publication Data

US 2018/0203860 A1    Jul. 19, 2018

(51) Int. Cl.
    G06F 17/30     (2006.01)
    G06F 16/2457   (2019.01)
    G06Q 30/00     (2012.01)
    G06F 16/2455   (2019.01)

(52) U.S. Cl.
    CPC .... G06F 16/24578 (2019.01); G06F 16/2455 (2019.01); G06Q 30/016 (2013.01)

(58) Field of Classification Search
    CPC .......... G06F 16/24578; G06F 16/2455; G06Q 30/016
    See application file for complete search history.

(56) References Cited

U.S. PATENT DOCUMENTS

| | | | |
|---|---|---|---|
| 7,111,282 B2 * | 9/2006 | Stephenson | G06F 11/3612 714/E11.209 |
| 8,055,546 B1 * | 11/2011 | Cassone | G06Q 30/0201 705/7.29 |
| 8,346,624 B2 | 1/2013 | Goad et al. | |
| 8,688,460 B1 | 4/2014 | Pletz et al. | |
| 9,372,898 B2 * | 6/2016 | Li | G06F 16/24578 |
| 9,916,227 B2 * | 3/2018 | Lachambre | G06F 11/3668 |

(Continued)

FOREIGN PATENT DOCUMENTS

WO     2016144784 A1     9/2016

OTHER PUBLICATIONS

"Identify and sell more to your most valuable customers", http://www.infoentrepreneurs.org/en/guides/identify-and-sell-more-to-your-most-valuable-customers/, Retrieved on: Oct. 27, 2016, 5 pages.

(Continued)

*Primary Examiner* — Tyler J Torgrimson
(74) *Attorney, Agent, or Firm* — Michael Best & Friedrich LLP

(57) ABSTRACT

A method of increasing utilization of a computer program product having a plurality of features usable by multiple user groups. The method comprises: accessing a database storing multiple scenarios each defining a course of action characterised by usage of a respective subset of the features; via a network interface, receiving logs of past usage of some or all of these features by a target user group; based on the received logs, identifying one or more of the features that are unused or less frequently used by the target user group, and selecting one or more of the scenarios for the target entity which make use of the one or more unused or less frequently features. An indication of the one or more selected scenarios is output via a network interface, thereby causing the target entity to follow the course of action defined in at least one of the selected scenarios.

20 Claims, 6 Drawing Sheets

(56) References Cited

U.S. PATENT DOCUMENTS

| | | | |
|---|---|---|---|
| 2006/0228690 A1* | 10/2006 | Lund | G09B 7/00 |
| | | | 434/362 |
| 2010/0057548 A1 | 3/2010 | Edwards | |
| 2010/0211428 A1 | 8/2010 | Duffy et al. | |
| 2012/0143694 A1 | 6/2012 | Zargahi et al. | |
| 2012/0150759 A1* | 6/2012 | Tarjan | G06O 50/01 |
| | | | 705/319 |
| 2013/0086178 A1* | 4/2013 | Osborne | G06Q 30/00 |
| | | | 709/206 |
| 2015/0317753 A1 | 11/2015 | Goel et al. | |
| 2015/0379603 A1 | 12/2015 | Gupta et al. | |
| 2016/0034425 A1 | 2/2016 | Liu et al. | |
| 2017/0255455 A1* | 9/2017 | Collier | G06F 8/61 |
| 2018/0061258 A1* | 3/2018 | Riscutia | G09B 5/12 |
| 2018/0203707 A1* | 7/2018 | Abadi | G06F 9/4451 |
| 2019/0012927 A1* | 1/2019 | Nishijima | G09B 19/167 |

OTHER PUBLICATIONS

"Marketing Your Products/Services and Promoting Your Organization", http://web.archive.org/web/20110626024439/http://managementhelp.org/freebusinesstraining/marketing.htm, Published on: Jun. 26, 2011, 9 pages.

"Productivity Library", http://fasttrack.microsoft.com/office/envision/productivitylibrary, Retrieved on: Jan. 23, 2017, 9 pages.

* cited by examiner

INCREASING UTILIZATION OF A COMPUTER SYSTEM

BACKGROUND

Software applications may be rolled out and deployed across an organization such as a company, university, hospital, etc., either hosted on a server of the organization or installed on individual computers belonging to users within the organization. Updates for such applications are often restricted to critical updates such as security patches, whilst other features in newer versions are not automatically updated, even though they may be able to serve the user better. In some cases, the software applications may have already been purchased under an enterprise agreement, but are not yet deployed on each of the individual computing devices. Information Technology (IT) managers, who are in charge of the application roll-out, are often unclear of the particular benefits they will get in upgrading the software used in their respective organization.

Automated software updates relieve the users within an organization (e.g. employees and IT managers) from having to manually check for and install new updates on a regular basis. However, the users may not be made aware of new features that are already included with the automated updates, and therefore may not be able to make full use of the new features. Even if a list of new features is provided with each automated update, the users are still not likely to relate the features to their day to day work.

When an organisation rolls out new software, or when using existing software, the users within the organization (e.g. employees or IT staff) may only know of certain key features that are prominently displayed in a user interface or that are well promoted. Inevitably, some features that may be useful may never get used, unless users take an active role in exploring and learning the new software (e.g. an employee has to read through user manuals to discover whether a particular feature is present).

As a result, the full capacity of existing, updated, or new software is often not utilised. Moreover, companywide roll-out of newer software that would improve productivity is often postponed.

To mitigate this problem, some software providers provide extensive customer support, e.g. call centres, to contact users within an organization (e.g. employees or IT staff) in order to understand their needs, and based thereon to suggest previously unused features that may be useful on an individual basis.

Alternatively, frequently asked questions or a library of common scenarios built on past customer feedback may be provided in a database, which allows an employee or an IT manager to relate to other users' experience and therefrom how the software can be used in a similar way.

SUMMARY

The prior methods described above attempt to bring unused, less frequently used, or not yet deployed features to the attention of administrative users. However, extensive customer service requires a large number of trained representative to deal with users' queries. In addition, the quality of advice given by the trained representatives varies and depends on a many factors such as the technical knowledge of the representatives, their understanding of the needs in different industries, as well as the clarity of information being provided. As a result such methods are not readily scalable.

Users such as employees in an organisation or their IT managers may alternatively consult databases to check for frequently asked questions and example scenarios which may help with their queries. However, this still requires a significant amount of work and initiative from users to actively search for a past question or scenario that is best in describing the problem at hand. Also, again the effectiveness depends upon the accessibility of information, e.g. the use of correct keywords and the ease of navigating the index system. This forms a barrier to some users preventing full exploitation of a software product.

According to one aspect disclosed herein there is provided a method of increasing utilization of a computer program product having a plurality of features usable by a plurality of user groups (which may be organizations, or subgroups such as departments within one or more organizations, or individual employees or group of users of the organisation). The method comprises: accessing a database storing multiple scenarios each defining a course of action characterised by usage of a respective subset of the features; via a network interface, and also receiving logs of past usage of some or all of these features by a target entity from amongst the plurality of entities. The method further comprises, based on the received logs, identifying one or more of the features that are unused or less frequently used by the target entity, and selecting one or more of the scenarios for the target entity which make use of the one or more unused or less frequently features. The method then comprises, via a network interface, outputting to the target entity an indication of the one or more selected scenarios, and thereby causing the target entity to follow the course of action defined in at least one of the one or more selected scenarios.

Thus the present disclosure provides a method and system for generating a bespoke recommendation that involves the use of unused or less frequently used features for a particular user or group of users, based at least partly on their past usage of said features. This advantageously increases the utility of the system by making more use of features that are previously under-exploited or not exploited at all. In embodiments, the recommendation takes into account a comparison with another entity having a similar profile.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

The following describes a recommendation portal system that promotes the use of unused or less frequently used features of a computer program product such as a word processing application, spreadsheet application, slideshow application, technical drawings application, or a package of any two or more such applications and/or others. The product in question may originate from a provider of the portal system (i.e. a first party) or from another party (i.e. a third party). The portal promotes usage of the unused or little used features of such a product to entities such as organizations, departments within an organization, or individual users, based on recommending "scenarios" that are related to the entity in question. Each scenario comprises a specification proposing a mode of operation that the entity may adopt in order to better exploit the lesser-user or unused features of the product. I.e. each scenario is tied to a set of services which may be deployed to extract better utility from the product. In embodiments, the output scenario may additionally contain one or more links to training material.

The generated scenarios are tailored to the entity for whom they are generated. To achieve this, the system is configured to receive logs of past usage of each of the users and based thereon to identify a list applicable scenarios that utilise said unused or less frequently used features for the entity (e.g. organization or user) in question.

In some embodiments, the system is also capable of utilising organizational and/or individual profiling (e.g. derived from social media data and/or company website data) to combine with usage information to derive feature insights. This data is then used to rank a list of scenarios tailored for each of the users. As a result, rather than having the users to pick from thousands of features to explore, they are presented with a more concise list of scenarios which are most likely to comprise unused or underused features that will benefit them. For example, a sales department within a pharmaceutical company is likely to encounter different scenarios to a legal department within an oil & gas company.

Figure 1A:
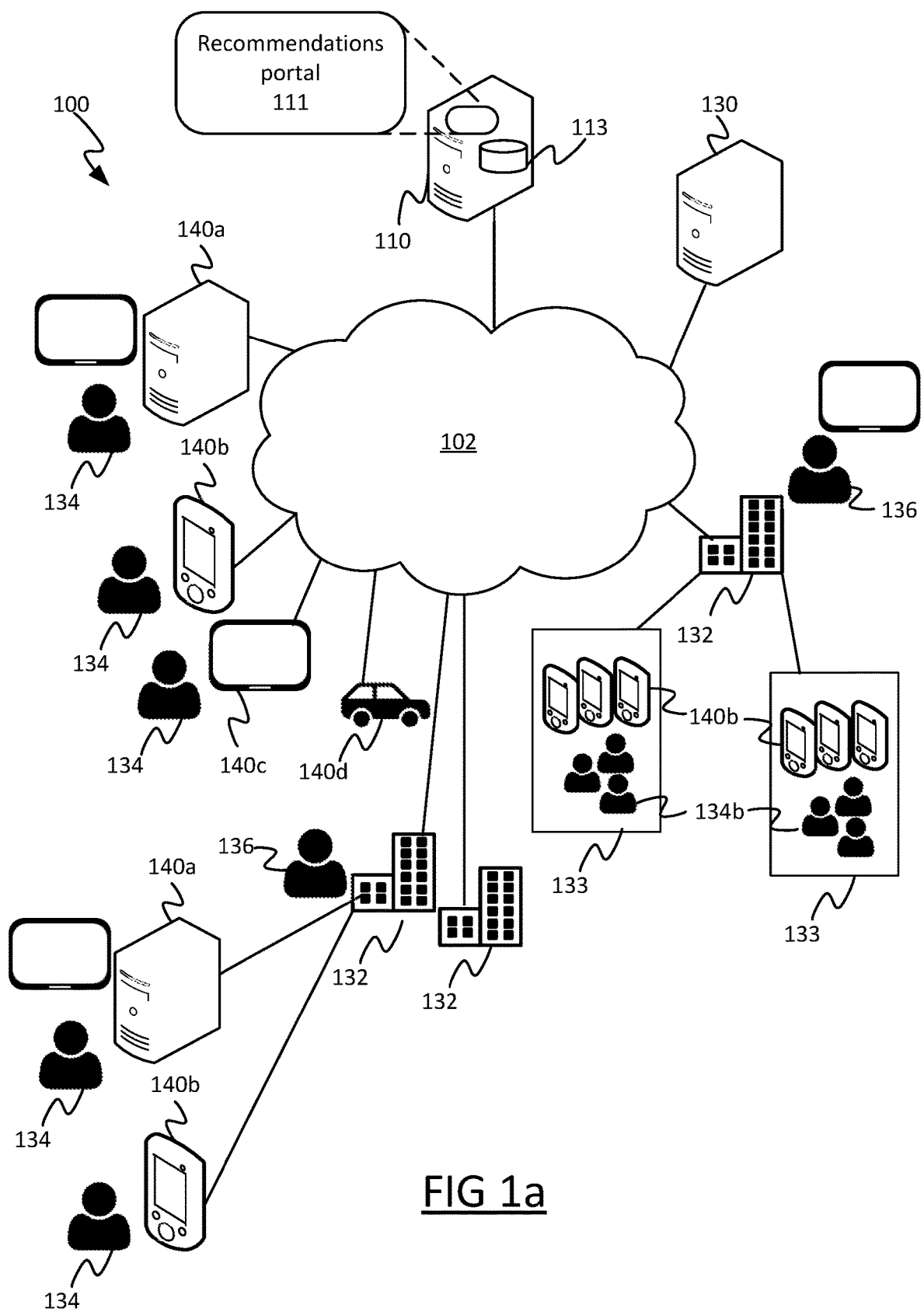
FIGS. 1*a* and 1*b* are a schematic illustrations of the system according to embodiments of the present disclosure.

FIG. 1 schematically illustrates a system 100 in accordance with embodiments disclosed herein. The system comprises a data processing system 110 comprising a server hosting a recommendations portal 111. Note that a server as referred to herein may comprise one or more physical server units located at one or more geographical sites (techniques for distributed storage and processing in themselves being known in the art). The recommendations portal 111 is implemented in the form of code stored on computer-readable storage of the data processing system 110 and arranged to run (e.g. be executed or interpreted) on a processing apparatus of the data processing system. The storage on which the code is stored may comprise one or more memory units employing one or more storage media, e.g. electronic storage such as an Electrically Erasable Programmable Read-Only Memory (EEPROM) ("flash" memory), and/or a magnetic storage such as a hard disk, or even optical storage or other forms known to a skilled person. The processing apparatus on which the code is arranged to run may comprise one or more processing units, e.g. one or more cores or one or more Central Processing Units (CPUs).

The data processing system 110 hosting the recommendations portal 111 is connected to a computer network 102, thereby enabling the recommendations portal 111 to communicate with the computer systems of one or more customer entities 132, 133, and 134, which may be organizations 132, departments 133 of an organisation 132, or individual users 134 (e.g. an individual user 134 can be a personal user 134 or individual employee 134b of a department 133 or of an organisation 132). A department 133 may be any division or a unit of said organisation, wherein there may be one or more departments within an organisation each serving a particular function or each operating in a particular geographical location or hierarchical level.

As shown in FIG. 1, an organisation 132 has a plurality of members such as employees 134b each using one or more computing devices 140a, 140b, 140c, and/or 140d provided to them, wherein the use of software applications for said computing devices 140 is managed either by the user 134 of that device him/herself or by an administrative user 136 (e.g. an IT manager). Each of the organizations 132, departments 133 or users 134 has a respective instance of one or more software applications installed on their computer system, and/or is arranged to access an instance of one or more software applications hosted on a server 130 elsewhere on the network 102 (e.g. a web-hosted instance of the application). As another possibility, some software applications may be partly run on a computer system and partly hosted on a server.

In use, the recommendations portal 111 maybe accessible to one or more users via any suitable respective computing device. In embodiments, the recommendations platform is only accessible to the administrative user 136 via a computer system of the administrative user 136, such as an IT manager 136 governing a group of computing devices 140 employed in a department 133 or an organisation 132. Alternatively, the recommendations platform may be accessible to individual personal users 134 (e.g. employees) directly, enabling them to manage their own computing devices 140. Either way, the administrative user manages software updates and/or roll-out for the computing devices.

The recommendations portal 111 is arranged to output recommended "scenarios" to the to the organizations 132, departments 133 or users 134, 136 via the network 102, wherein a scenario comprises a specification recommending a way of working which will result in the user 134, department 133 or organization 132 extracting more utility from one or more of the applications by making use of one or more features of the application(s) that the user or organization is currently not exploiting or at least not exploiting to their full potential.

Alternatively or additionally, the recommendations portal 111 may be arranged to provide the recommended scenario(s) for a given software application or suite of software applications to the administrative user(s) 136 and/or end-users 134 of the department 133 or organization 132 in question (either via the network 102 or via other communication means). For instance, an application provider may wish to draw upon the services of the recommendations portal 111 to gather recommendations which they can use to promote more effective usage of their products to their customers 132, 133, 134.

Some or all of the applications for which the recommendations portal 111 provides recommendations may be first party applications, i.e. the application software is provided by the same provider that also provides the recommendations portal 111. Alternatively or additionally, some or all of the applications for which the recommendations portal 111 provides recommendations may be third party applications, i.e. the application software is provided by the same provider that also provides the recommendations portal 111. For instance, B sells software to A, and to support this B contracts the services of C who provides a recommendations platform to analyse B's software and provide recommendations for A on B's behalf. In this case the recommendations may be supplied from the recommendation's portal 111 to the target organizations 132 or departments 133 via a server of B (not shown), or directly on B's behalf.

As an example, a third party provider may supply an add-on product or service (e.g. a photo curating application) to supplement a product of a first party service provider who offers a collaborative product or service (e.g. a suite of office applications such as a word processing application, spreadsheet, etc.) and who runs the data processing system 110 for the collaborative product.

In FIG. 1, a certain number of users 134, departments 133, and organizations 132 are shown for illustrative purposes, but it will be appreciated that there may be different numbers involved in other scenarios covered by the present disclosure.

The applications provided to different entities, i.e. the organisations 132, the departments 133 and users 134, are each installed on computer-readable storage of their respective computing devices 140a-d, and arranged for execution on a respective processing apparatus of the respective computing devices. The storage may take the form of one or more storage media (e.g. magnetic memory, electronic memory, and/or optical memory) implemented in one or more memory units. The processing apparatus may take the form of one or more processing units. Each of the computing devices 140a-d may take any of a variety of different forms, e.g. a user terminal such as a desktop computer 140a, laptop, tablet 140c, smartphone 140b, smart watch, pair of smart glasses, smart TV, set-top box, conference room phone unit, or in-vehicle consoles. Other examples include Internet of Things (IoT) devices such as connected cars 140d, connected fleets, and factory sensor devices. Note also that the different user terminals or computing devices need not necessarily take the same form as one another. Moreover, the term "computer" as used herein does not restrict to a traditional desktop or laptop computer.

Alternatively or additionally, one or more of the applications in question may be hosted "in the cloud", i.e. stored on a server and accessed by a suitable client application installed on the user terminals. For instance, in the case of a web-hosted application, this server comprise a web server and the user terminal accesses the functionality of the application through a web browser.

The network 102 is preferably a packet-based network. In embodiments, it may take the form of a wide-area internetwork such as that commonly referred to as the Internet. Alternatively, the network 102 may take the form of another type of network such as a company intranet. Each of the computer systems of the organizations 132, departments 133 or users 134 may be connected to the network 102 via any suitable wired or wireless interface, e.g. using a wireless interface such as a Wi-Fi or Bluetooth interface in the user terminal to connect to a wireless router or access point in the home or office, or using a wired interface such as a Public Switched Telephone Network (PSTN) modem or Ethernet interface to connect via a PSTN network or Ethernet network respectively.

Each software product supplied to an organization 132, department 133 or user 134 (i.e. each application or suite of applications) comprises a plurality of features, which are functions of the application or applications, e.g. which may be mapped to a set of one or more buttons or other user interface controls or logic that user may interact with within the application(s). For example, such features may include 'pivot tables' in a spreadsheet application, or 'publish as slideshow webpart' in a slideshow application, or 'basic workflows' in a workflow automation application.

In order to be able to provide recommendations, the recommendations portal 111 first collects logs of the usage of various ones of the features of one or more of the applications. The logs are stored at the logs database 113 at the data processing system 110. The usage logs record how many times a particular feature has been used by an organization 132, a particular department 133 of said organisation 132, or particular users (e.g. employees) 134 within a particular organization or department, either in absolute terms (the total number ever) or in terms of the frequency of usage (number of times used per unit time or within a certain predefined window of time). The logs may be collected on a per user basis, or for an organization 132 as a whole, or for a certain subgroup of users within an organization (e.g. a certain department such as the accounts department, engineering department, etc.). The logs are collected by the respective computer systems of each of the users 134 or organizations 132. The logs are collected by the recommendations portal 111 via the network 102, either in one go or in an ongoing fashion (e.g. periodically or in response to events such as a user 134 or organization 132 selecting to submit the logs).

Figure 2:
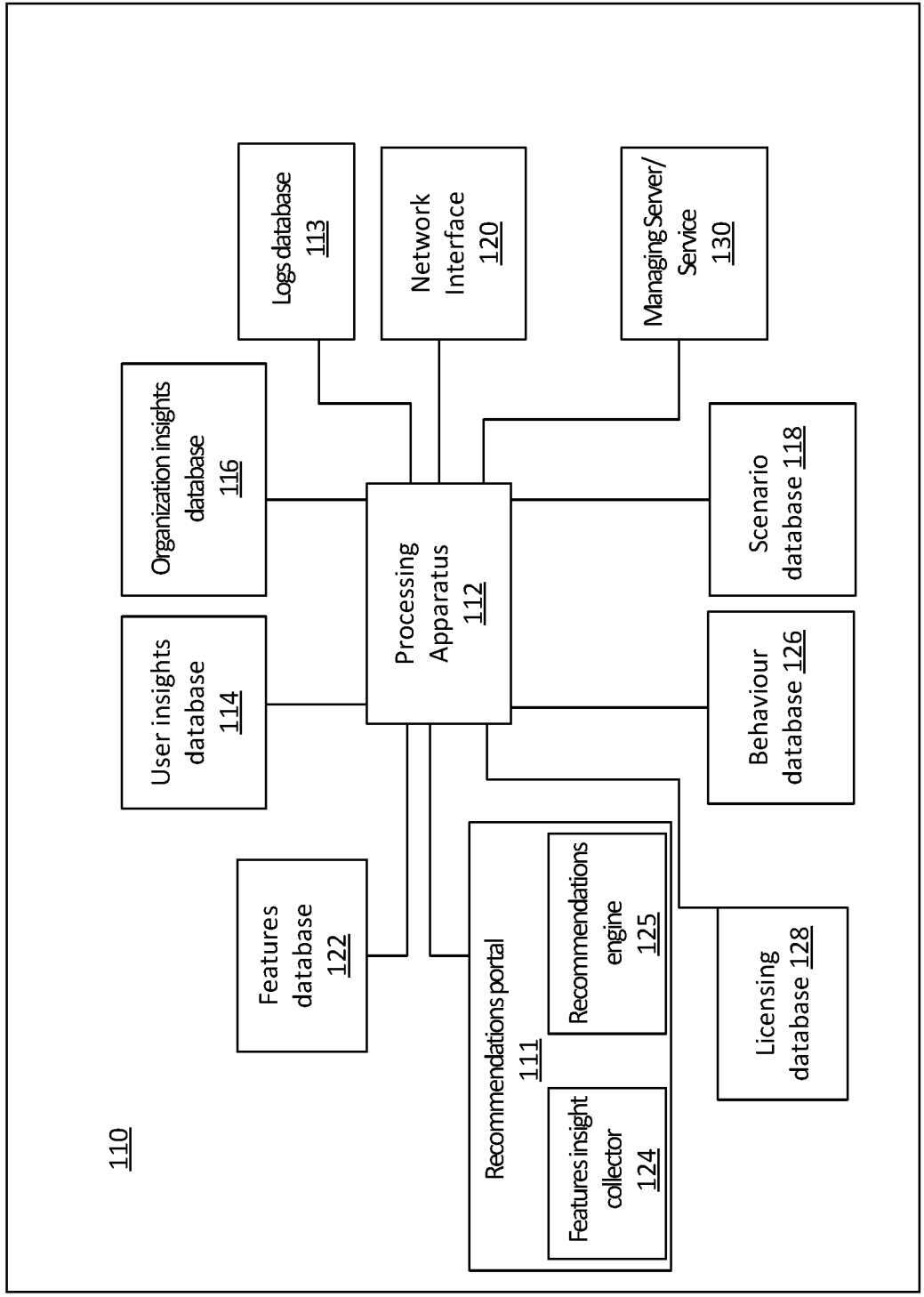
FIG. 2 is a block diagram of the system according to embodiments of the present disclosure.

By whatever means the logs are collected, the recommendations portal 111 is configured to store and/or process the logs to identify one or more features of one or more of the applications which are currently underused by a particular user 134, a department 133 or an organization 132, either in that they are completely unused, or are used less relative to other features of the application or applications in question or to similar organisations, departments or users in usage pattern. Furthermore, the recommendations portal 111 is arranged to access a database of "scenarios" 118 (FIG. 2). Each of the scenarios comprises a specification of a respective workflow that the organization 132, department 133, or user 134 may adopt, characterized by making use of a particular one or more features of the application or applications. For instance, examples of such scenarios may include a "Gather resources using social media" scenario, and/or a "Online document management" scenario, and/or a "Policy Violation Records" scenario.

The scenarios may be uploaded to said scenarios database 118 by a first party provider or one or more third party providers. In some embodiments, the scenarios may be manually categorised by the first party provider or third party providers, as being relevant for certain types of organisations, certain departments, or users with certain characteristics. For example, the first party provider or third party providers may highlight each of the uploaded scenarios for recommending to a group of selected users. Such recommendations are stored in the scenarios database 118 and may be used for the ranking of recommended scenario as detailed later on.

The recommendations portal 111 is configured to compare the one or more unused features that it has identified from the logs stored at the logs database 113 with at least some of the scenarios in the scenario database, and based thereon identify a set of one or more of the scenarios from the database that would make more use of the identified feature(s). For instance, the recommendations portal 111 may identify that the user 134 or organization 132 is not making use of the ability to upload documents to the cloud, or to poll statistics from social media, or is not using pivot tables. In response to such an identification, the recommendations portal 111 may recommend scenarios such as the "Online document management", which sets out a workflow for an organization 132 to exploit secure online storage or backup of documents; or the "Gather resources using social media" scenario, which specifies a workflow enabling an organization to exploit the availability of online statistics concerning consumers; or the "Policy Violation Records" scenario which entails the collating of images taken by mobile phones, application of structured metadata, then workflow around following up on each violation.

Figure 1B:
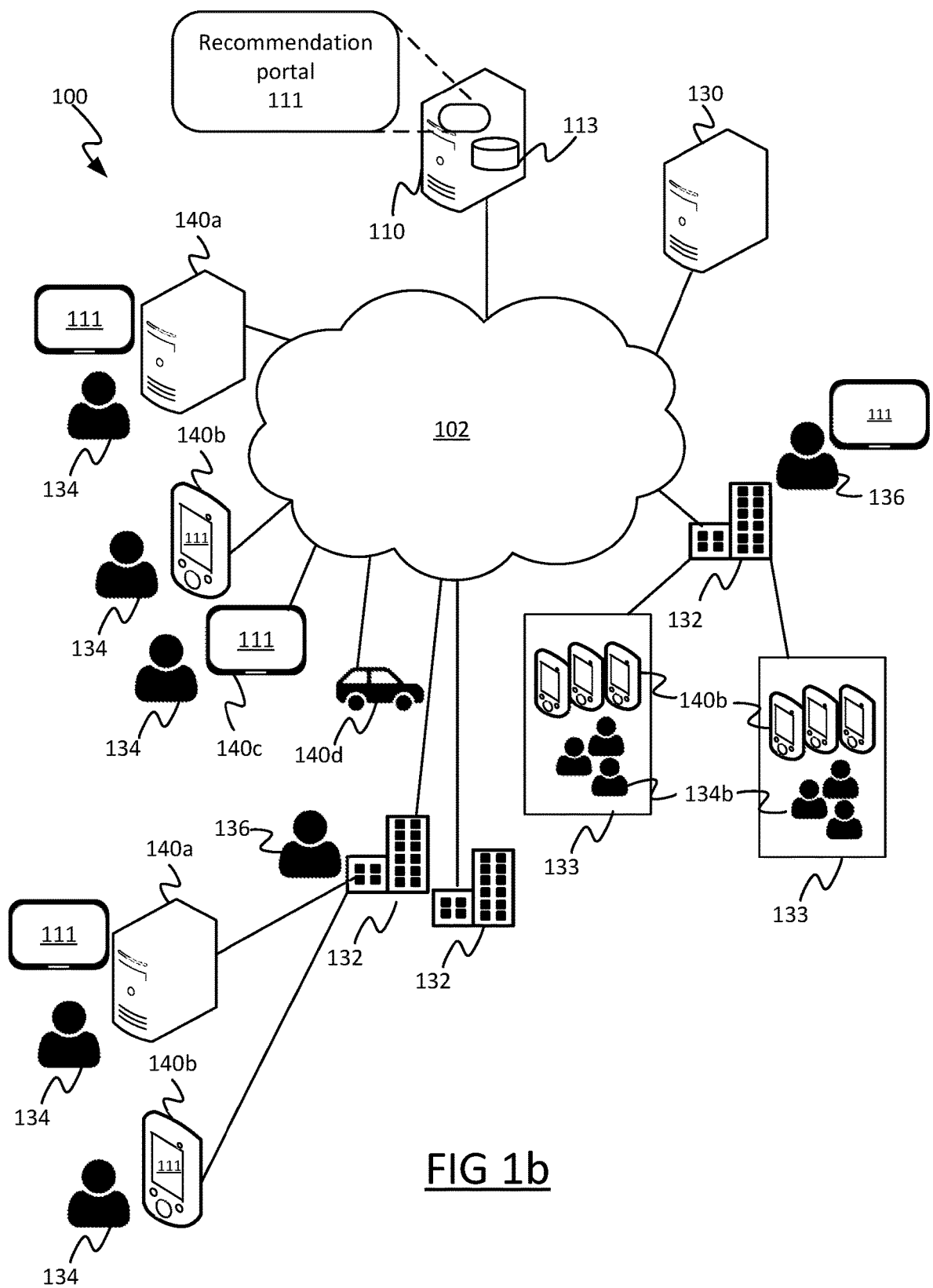

The administrative users 136 of the organization 132, department 133 or user 134 for whom the recommendation is being generated may access the recommendations portal 111 to access the set of scenarios, either directly via the network 102, or via the managing server 130 of the software application in question. E.g. the recommendations portal 111 is accessible via the administrative users' computing devices but not the computing devices of those employees who are not classed as administrative users, as shown in FIG. 1b.

In embodiments, the recommendation portal 111 is configured to output the set of recommended scenarios to the target organization 132, department 133 or user 134 in the form of a ranked list, wherein the ranking is indicative of an estimated relevance of the scenario to the target organization 132, department 133 or user 134. For instance, the ranking may be based on how many unused features the scenario makes use of, and/or an estimate of a difference between how often one or more features would likely be used in the recommended scenarios and how often the target organization 132, department 133 or user 134 currently uses the same one or more features.

In embodiments, as will be discussed in more detail shortly with reference to FIG. 2, the recommendations portal 111 is configured to additionally base the recommendation for a given organization 132, department 133 or user 134 (the target organization, department or user) on the logs of one or more other similar organizations, departments or users (respectively), and/or which recommended scenarios have adopted by one or more other similar organizations, departments or users. To do this the recommendations portal 111 is configured to obtain a profile of the target organization 132, department 133 or user 134 and profiles of the one or more other organizations 132, departments 133 or users 134. Each profile comprises one or more pieces of information concerning the respective organization 132, department 133 or user 134, e.g. company type (e.g. pharma, manufacturing, etc.) and/or company headcount. The recommendations portal 111 may be configured to access the profile data for each organization 132, department 133 or user 134 from any suitable source, such as a company website of an organization, or a social media site on which the organization 132 has an account, or from records stored on the organization, department or user's own computer system.

Based on a comparison of the profile data, the recommendations portal 111 identifies one or more other organizations 132, departments 133 or users 134 similar to the target organization 132, departments 133 or user 134, for instance having the same company type (e.g. pharma) and/or headcounts within certain predetermined margin of one another. The recommendations portal 111 then uses information on past used features and/or scenarios of the one or more similar organizations 132, departments 133, or users 134 as a factor in determining whether to include certain scenarios in the set of recommended scenarios to be output to the target organization 132, department 133 or user 134. Alternatively or additionally, in embodiments where the set of recommended scenarios may be output to the target organization 132, department 133 or user 134 in the form of a ranked list, the ranking of each scenario may be partially or wholly based on how many times (or how often) the scenario or the features of the scenario have used by the one or more similar organizations 132, departments 133 or users 134.

In embodiments, one or more further factors may be involved in the ranking and/or in the decision as to whether to include a scenario in the recommended set at all. For instance, each of the scenarios may be allocated a respective weighting in the weighting database. This enables the provider of the recommendations portal 111, or another administrator such as one of the application providers, to give a weighting towards promoting one or more particular scenarios.

In embodiments, the recommendations portal 111 may be configured to determine a ranking score for each of the scenarios in the database, wherein the ranking score gives an indication of the likely relevance of the scenario to the target user, department or organization. The ranking score may be based on any one or more of a plurality of factors, such as: (a) the number of previously used features the scenario makes use of, (b) how often the scenario will make use of one or more features compared to the organization's or user's current usage, (c) the weighting assigned by the provider of the recommendations portal 111, (d) how often the scenario has been adopted by the one or more similar organizations 132, departments 133 or users 134, and/or (e) how often one or more features of the scenario has been adopted by the one or more similar organizations 132, departments 133 or users 134. In the latter two cases, optionally the ranking score may also be weighted by a measure of a degree of similarity between the target organization 132, department 133 or user 134 and the one or more similar organizations 132, departments 133 or users 134.

The ranking score may then be used for one or both of the following purposes. In embodiments, the ranking score is used to determine which scenarios are included in the set of recommended scenarios. In this case, the recommendations portal 111 is configured to evaluate the ranking score for each of the scenarios in the scenario database, and to either include only the top "n" ranked scenarios in the recommended set, or to include all scenarios having a ranking score greater than a predetermined threshold. Alternatively or additionally, the recommendations portal 111 may be configured to output the set of recommended scenarios in a form in which the scenarios are presented in order of their ranking score, e.g. a ranked list.

In some embodiments, another factor that may be taken into account is the length of time that the target organization 132, department 133 or user 132 has been using the application or suite of applications in question since last updating the application(s). The recommendations portal 111 may be configured to determine this from the usage logs or other records, and adapt the recommended scenarios based on this information. In embodiments, if the target organization 132, department 133 or user 134 has been using the application or suite of applications for greater than a first predetermined threshold amount of time without updating, the recommendations portal 111 may give a greater weighting to recommending scenarios that make use of one or more features that would be obtained from an update (thus pushing adoption of updates). And/or, if the target organization 132, department 133 or user 134 has been using the application or suite of applications for less than a second threshold amount of time without updating (wherein the first threshold could be the same or different to the first threshold), then the recommendations portal 111 may give a greater weighting to scenarios making use of one or more features enabled by the recent update (thus assisting the organization 132, department 133 or user 134 to discover the features of the newly updated software).

As shown in FIG. 2, the data processing system 110 comprises a network interface 120, a features database 122, a user insight database 114 and/or organization insight database 116, a scenario database 118, and a processing apparatus 112 comprising one or more processing units. The data processing system 110 further comprises the recommendations portal 111 stored on a memory (comprising one or more memory units) and arranged to run on the processing apparatus 112. The recommendations portal 111 comprises a feature insight collector 124 and a recommendations engine 125. In some embodiments the data processing system 110 may also comprise a licensing database 128.

The network interface 120 provides an interface for the data processing system 110 to connect with the computer systems of the organizations 132, departments 133 and/or users 134, and/or with the managing server 130, via the packet based network 102, in order to receive the feature usage logs as mentioned previously. In use, features available for each of the products being analysed (each of the applications or suites of applications) are identified by their respective computer system or managing server 130 and subsequently uploaded and listed at the features database 122. For example, the data processing system 110 may request a list of said available features from each of the computer systems of the organizations 132, departments 133 or users 134 or from the managing server 130 on a regular basis, or otherwise the list maybe updated in real time as new features are added to the respective products. In some embodiments, a submission portal may be provided for allowing the organizations 134, departments 133, users 134 and/or managing server 130 to upload, via the network interface 120, an indication of new or updated features to the list in the features database 122. Alternatively, each of managing servers 130 may automatically submit their respective updated feature lists to the features database 122 through the submission portal.

Each of features is recorded in the feature database 122 by means of a feature identification (ID). In some embodiments, each of the feature IDs is one of a scheme of feature IDs that is globally understood and shared by first party suppliers and third party suppliers. That is to say, different applications from different providers may use a common scheme of feature IDs such that a given kind of feature is identified by the same ID for different products from different providers. For example, the use of an "upload to cloud" feature across different products may be assigned with the same feature ID, even though the products are each supplied by different service providers.

Figure 3:
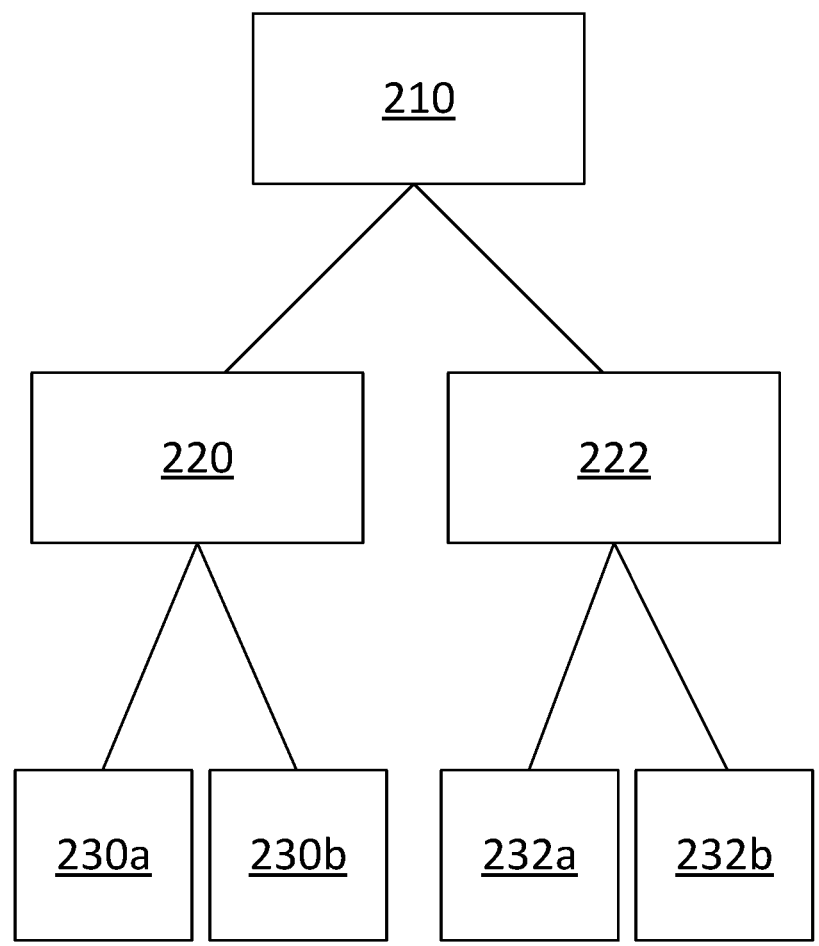
FIG. 3 is an illustration of a hierarchal relationship between features and feature insight definitions according to embodiments of the present disclosure.

Upon receiving a new or updated feature list, the processing apparatus 112 may carry out processing and analysis of the features in the feature list. As illustrated in FIG. 3, each of the features 220,222 in a feature list 210 may be broken down into one or more feature insight definition 230a,b, 232a,b. For example for a particular product, the feature insights definition 230,232 may range from the simplest 'usage of a particular feature', to 'Basic Formatting Insights' which may be an enumeration of a set of formatting actions (e.g. how many times the bold/italic/underline buttons are clicked in a word processing application, slideshow application, spreadsheet, and/or email client, etc.), to more complex definitions (e.g. the number of times an organization or user creates a document of more than 5 pages in length, then shares it with 5 other entities). Therefore, feature insight definitions 230,232 can be defined as statistical means to monitor how consumers utilise different features that are offered in a product.

The feature insight definition 230,232 may be a code, or may be a declarative list with simple math articulating how counts are performed. Therefore, whilst the input required for each definition are raw telemetry data points, their outputs are expressed as frequency of occurrence. In embodiments, the feature insight definitions 230,232 may be provided by application providers which enables them to acquire statistics that are specific to their products, e.g. "Basic Formatting Insights". Such feature insight definitions 230,232 may be uploaded directly to the feature database 122 and thus made readily assessable by the processing apparatus 112 when running the feature insight collector 124.

In some embodiments, the service providers need not submit such feature insight definitions 230,232 to the data processing system 110. Instead, some simple feature insight definitions, such as "usage of a product/feature", are applicable for any features or products, and therefore such feature insight definitions may be defined by default at the data processing system 110 and stored in the feature database 122 for access by the feature insight collector 124.

In some embodiments, information regarding scenario preference and utilisation may also be captured. That is, the feature insight collector 124 may additionally collect positive and negative efficiency indicators. Positive efficiency indicators are registered when a user (or a department or organisation) uses particular features in a software application, whereas negative efficiency indicators indicate the frequency of said features are not being used.

For example, an organisation 132 may be using the Word template for "policy violations", yet may not be using more sophisticated features to access the collection of information about policy violations, and/or to achieve the workflow to address the violations, etc. The feature insight collector 124 detects the lack of use in said more sophisticated features and thereby creates negative efficiency indicators to flag up such underuse.

Additionally or alternatively, an administrative user, e.g. the IT manager, may be able to assess any of the said sophisticated features and thereby indicate their lack of interests in some of them. For example, they may use the recommendations portal to submit feedback (thumbs up/thumbs down) to the feature insight collector 124 that they are (or are not) interested in Policy Compliance. This nullifies the negative efficiency indicators registered due to non-use of said sophisticated features.

Said positive and negative efficiency indicators (e.g. indicating how efficient the features are used), as well as the feedback information from administrative users (e.g. indicating the user's preferences) may be stored in a behaviour database 126. The stored information contributes to the ranking score of each scenario, e.g. scenarios comprising said unused sophisticated features as indicated by negative efficiency indicators, are given a higher ranking score so to promote the use.

Figure 4:
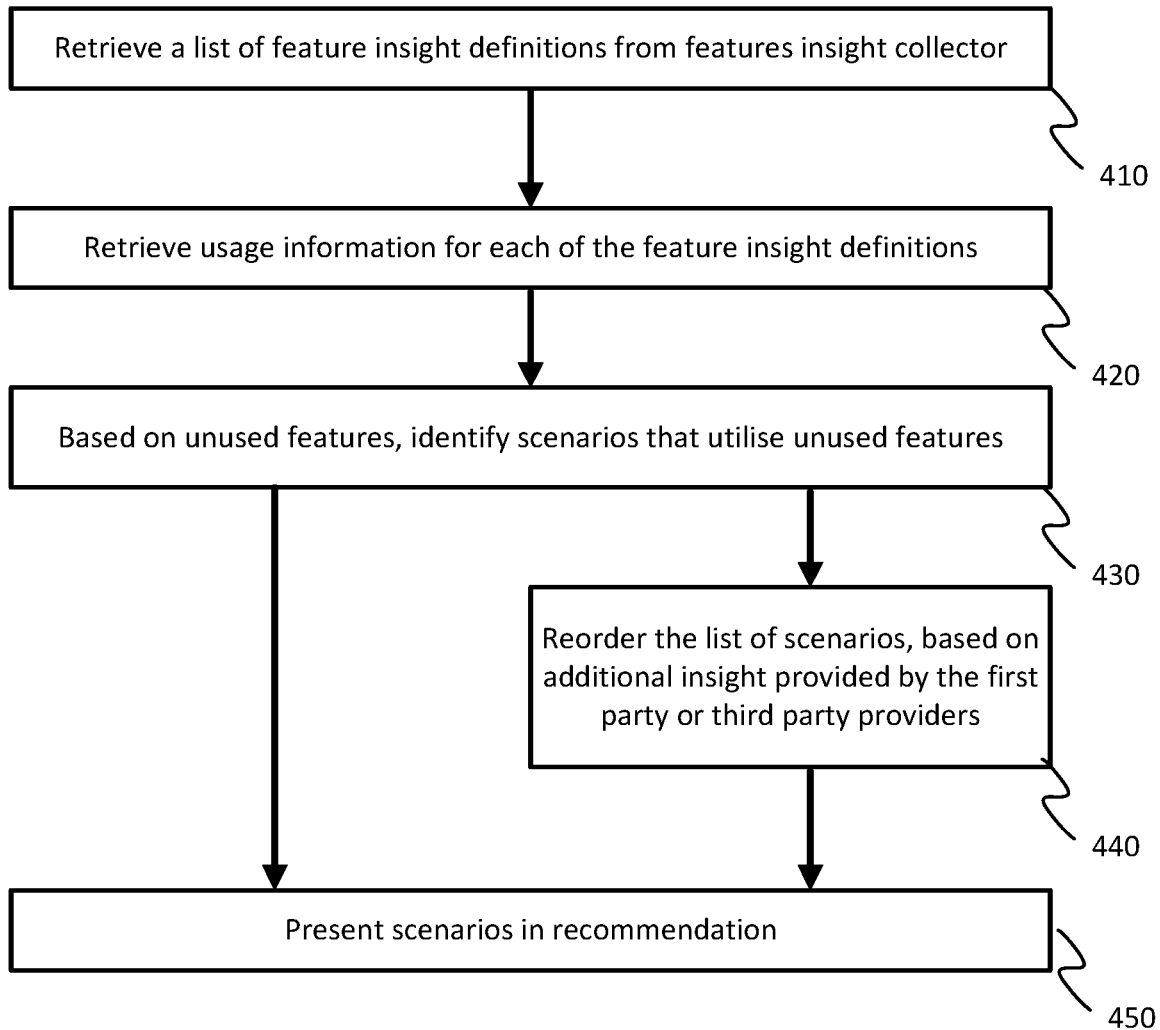
FIG. 4 is a process flow chart for recommending applicable scenarios based on the past feature usage of an entity according to embodiments of the present disclosure.

FIG. 4 illustrates a method of providing recommendation to an entity such as an organization 132 or user 134 based on detecting past feature usage of said entity. The process starts at step 410 by retrieving the stored feature insight definitions 230,232 from the feature insight collector 124. Subsequently, at step 420 the feature insight collector 124 also acquires usage information according to the available feature insight definitions 230,232 listed against each of the features 220,222 of their respective product. For example, the feature insight collector 124 may search through usage logs to determine the occurrence of an event as defined in the feature insight definitions 230,232, and subsequently stores this information at the data processing system 110.

The scenarios database 118 stores a list of scenarios, each defining a solution to a problem that organizations 132 or users 134 frequently encounter. For example, the scenario may be "better predict next year's sales" or "drawing 3D objects". Each scenario comprises a summary describing how some features in the given product can help to overcome such problems. In some cases, a new product or a product add-on comprising new features for overcoming a particular problem may be suggested in the scenario. In addition, user instruction and set up guides may be provided to guide the user in using such features and/or installing new upgrades. In some embodiments the scenario comprises links for activating features or carrying out actions as defined in feature insight definition in an automated fashion. Said list of scenarios in the scenario database 118 may comprise scenarios defined by the provider of the recommendations portal 111, and/or scenarios uploaded from one or more managing server 130 via the network interface 120.

Once the data processing system 110 has captured sufficient usage information of a particular organization 132 or user 134 through the feature insight collector 124, at step 430 it highlights any unused or less frequently used features and thereby identifies a list of scenarios that utilised said unused or less frequently used features. In embodiments where the scenarios are manually marked (or tagged up) as being relevant for certain types of organisations, departments, or users, there is an additional step 440 where additional insight provided by the first party or third party providers may help promoting or demoting particular scenarios in the list, e.g. step 440 reorder the listed scenarios according to the relevance of each scenario. At step 450, the recommendations engine 125 then identifies and presents a recommendation for increasing the usage of the one or more unused or lesser used features to the target organization 132 or user 134 in the form of one or more scenarios. The target organization 132 or user 134 can then explore the feature(s) more effectively since the scenarios may demonstrate how one or more unused features can be applied to solve an actual problem.

In some embodiments, an administrator of the recommendations portal 111 may introduce an adjustment factor for adjusting the score of a particular scenario or feature to increase the use of unused or less frequently used features. For example, the administrator may specify an adjustment factor to adjust the score for improving the ranking of a given scenario that contains unused or less frequently used features. Or alternatively the adjustment factor may be used for lowering the ranking of a given scenario if they are deemed irrelevant or if they are already implemented sufficiently within an organisation using other means. This technique is also useful for embodiments where an administrative user has indicated his/her lack of interest in said unused or less frequently used features. E.g. the feedback information stored at behaviour database 126 may lead to an adjustment factor to adjust the score for worsening the ranking of said undesirable scenario. The administrator could be a provider of the recommendation portal or could be one of the third party providers of the applications.

Thus far, there is disclosed a method of making recommendations to a target entity such as an organization 132, department 133 or user 134 based on measuring past usage of features or features fitting a feature insight definition by said entity. In embodiments, the recommendation may be made to the target entity 132, 133, 134 additionally based on the usage of features by one or more other entities 132, 133, 134 sharing a similar profile. In these embodiments, the data processing system 110 further comprises a user insight database 114 and/or an organization insight database 116 for storing user insights and company insights respectively. Organization insights comprise, for example, company profile data related to a specific company 132 and can be extracted by any suitable means. For example, company specific information such as the size, geographical location and type of a company may be extracted from said company's website or other databases and official records. Alternatively, the organization insights may be provided by the application provider or the company itself, e.g. by filling out a questionnaire. Company specific information captured from different sources for different companies may be normalised using any known techniques such that the company insights are comparable across different companies. The raw tags and normalised tags associated with each company are saved in the organization insight database 116. In some large corporations, the company insight data may be subdivided to provide specific information for a part of the company, e.g. a branch, a department, a division or a subsidiary, instead of the company as a whole. This reflects the actual need for a particular department (e.g. human resources), which could be distinct from the rest of the company. For example, it is possible to estimate a target organisation's (or a target department's) usage of a feature or occurrence of a scenario by referencing from the usage information of a similar organisation or a similar department. More examples are given in subsequent paragraphs.

In contrast to organization insights, the user insights captures user information in relation to a specific user, e.g. position, education and/or skill of an employee. Such user insights may originate from various sources, such as extracting user profile data from an employee directory or social media (e.g. professional social media site profiles). Data normalization techniques may be employed to normalise users with similar titles into the same categories. For example, personnel with Regional Account Manager, Sales Account Manager, Manager: Sales Accounts as their job titles all work in a similar roles and therefore can be placed in the same category. In some embodiments, the employees may be categorised according to their education or skill sets, e.g. sales, legal and scientist. The raw tags and normalised tags associated with each employee are stored in the user insights database 114. As another alternative or additional variant, insights may be collected and/or aggregated on a per department level (see below).

The usage information collected by the features insight collector 124 may be aggregated within a given organisation based on the user insights and/or organization insights. For example, if the user insights and/or organization insights are based on job role and/or department (e.g. sales or sales department) and the feature insight definition is taken to be a specific temporal range (e.g. using slideshows at least three times a week), the data processing system may return an aggregated usage information from profiles fitting all the insights e.g. 87% of sales personnel use slideshows at least three times a week.

In some embodiments, the features insight collector 124 may determine the most suitable combination of different types of insights to perform aggregation for different scenarios. For example, the feature insight collector may decide whether the aggregation should be based on the number of employees who use a particular feature at least once a month, or the total duration that feature is being used each day.

The usage information of different features allows the occurrence of various scenarios be estimated. For example, if a scenario presents a problem that requires the users to utilise a particular combination of features, then the usage information of said combination of features, at an organisation or by employees of certain role, readily reveals how frequently the particular scenario occurs in said organisation or encountered by personnel work in said role. As a result, an association may be made between a given scenario with an entity 132, 134, fitting a certain profile, wherein said association maybe stored in the respective user insight databases 114 and organization insight databases 116. This association allows the recommendations of suitable scenarios to be made to other entities 132, 134 based on the similarity in their profiles.

Figure 5:
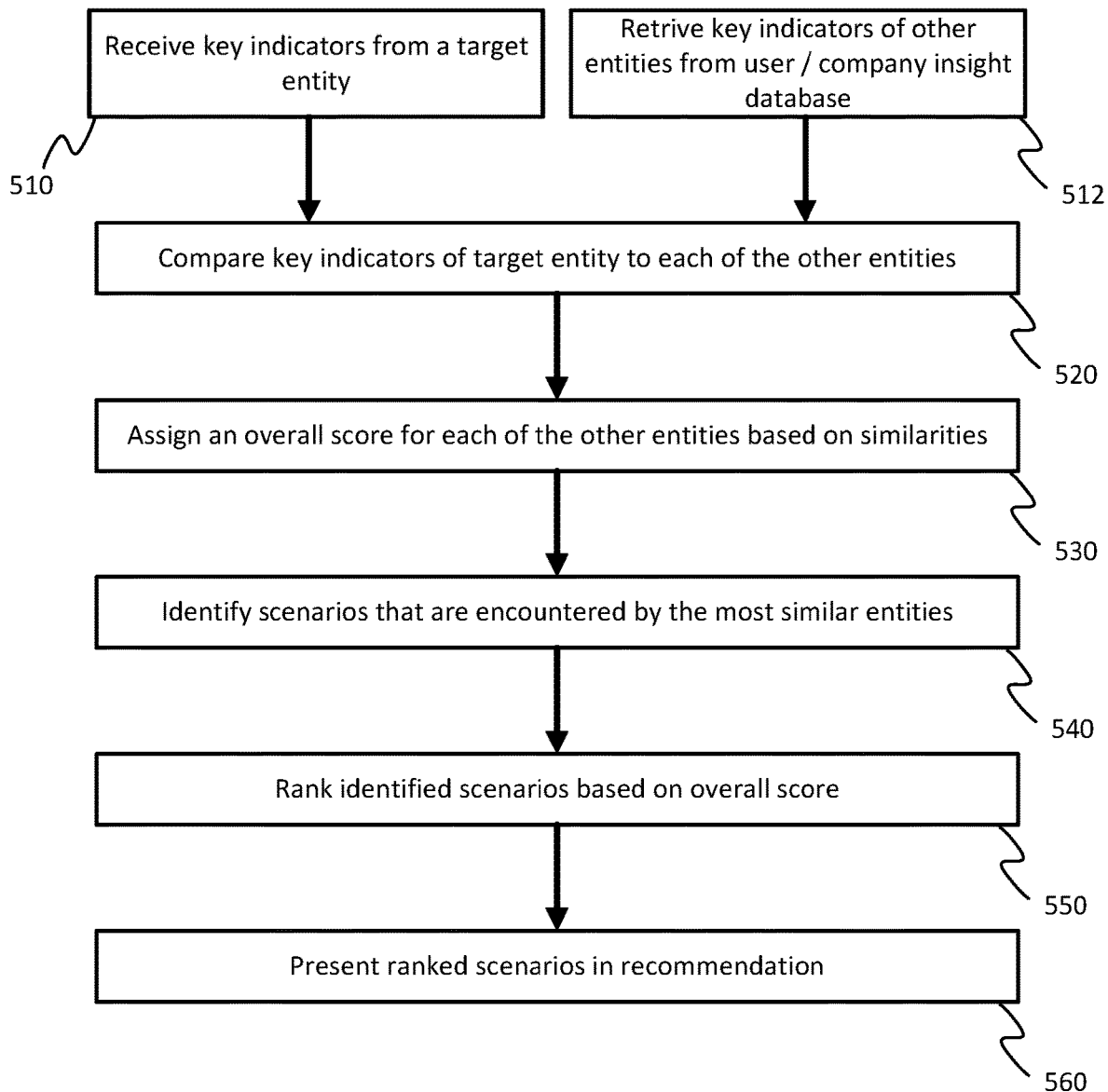
FIG. 5 is a process flow chart for recommending applicable scenarios based on the past feature usage of another entity having a similar profile according to further embodiments of the present disclosure.

Using a target organisation as an example, it is possible to estimate its usage of a feature or occurrence of a scenario by referencing from the usage information of a similar organisation or a similar department, as shown in the process of FIG. 5. Such estimation may be carried out at the organisation or department level, or at a more defined part of the organisation e.g. an employee group. This may be achieved by first identifying other organisations or departments in the company insight database that fits a similar profile to the target organisation (or target departments). For example, at step 510 the method may comprise receiving key indicators of the target organisation (e.g. size, industry, geography, ratio of sales to engineers to service personnel, other functions), and at step 512 the method may comprise receiving the same key indicators for all the other companies listed in the organizations insight database. At step 520 the key indicators of the target organization are then compared against the key indicators of the other organizations. Subsequently at step 530, each of the key indicators of the listed companies is scored by its similarity with the target organisation, and therefrom there is generated an overall score for each of the listed companies. Each of the key indicators may be assigned with its own weight such that some indicators (e.g. industry) are more relevant than others (e.g. size).

At step 540, once each of the company listed in the company insight database has been assigned an overall score, they can be plotted in a distribution graph. Therefore, a company listed in the company insight database having a similar score to the target organisation can be considered to share a similar profile and therefore provides a viable reference for recommending scenarios to the target organisation. At step 550, the recommended scenarios for the target organization are then identified and ranked, at least in part based on the past usage by the other organizations identified as being similar. E.g. the scenarios frequently used or encountered by the most similar organisation, or the scenarios comprising one or more features most frequently used by the most similar organization, may be ranked highest in the recommendation to the target organisation. At step 560 the list of recommended scenarios is output to the target organization 132 via the network 102. In some embodiments, the recommendation is provided to the administrative user 136 (e.g. IT manager) of the target organization 132 via a computing device of the administrative user 136 (see again FIG. 1b). Alternatively, it is not excluded that in some embodiments the recommendations could be provided directly to the computing devices 140 of the end-users (e.g. employees) 134 themselves. The recommendation may be output in an automated fashion (e.g. periodically) or at the request of the target organization.

By similar technique, the method is also applicable for comparing an employee grouping to other groupings listed in the user insight database, or for comparing a user profile (e.g. male and aged between 18-25) to other listed user profiles, in order to reference similar profiles and thereby provide viable recommendations.

In some embodiments, the data processing apparatus 110 comprises a licensing database 128 which separately records which products an entity such as an organisation has already paid for, and if granularity is supported, which employees have licenses. For example, the licensing database 128 may contain licensing information of an organisation where the legal department have previously purchased a different portfolio of products as compared to what is normally provided for a typical employee in other departments, and thus the features that are accessible for legal department may be not be provided for employees in other departments.

In some embodiments, the ranking of scenarios in the recommendation is based on whether all the features in a scenario are purchased. The ranking of scenarios may also be affected by the duration since a feature has been purchased. For example, if an entity has recently purchased a feature the recommendation would focus on recommending scenarios having said feature, so to promote its use. Or if a feature has been purchased for a given period and it has not been utilised, the recommendation would then recommend the entity to purchase new features instead.

In some embodiments, the licenses may be recorded in the licensing database 128 for a given feature. In some embodiments, a licensing map is provided based on the licensed features, e.g. the licensing map articulates which licenses correspond to which features or scenarios. In some embodiments, a price map may be provided to map features to the price of a license, and based thereon provides quotation for scenarios having features that are not yet purchased.

In some embodiments, analytics may be provided in the submission portal to the first or third party providers of products indicating the most viewed scenarios or features. It may further provide feature usage information of each entities to the first or third party providers.

The target organization 132 may access the recommendation through a recommendations portal provided by the recommendations portal 111, e.g. in the form of a ranked list of scenarios tailored to said organization.

As a specific example, the recommendations engine 125 of the recommendations portal 111 may calculate a score per scenario by using a weighted algorithm that may take into account any one or more of the following factors.

How much is organisation X frequently using these scenarios already (where lower existing usage causes a higher score. The system can thus say that 10 out of a given set of 363 individuals are using a given scenario today—so there is a chance for 353 more individuals to start using it.)

How much is organisation X using this scenario compared to similar organisations W+Y+Z (where a lower relative usage causes a higher score).

Has the organisation already purchased the capabilities for this scenario (if the customer has just completed a purchase, it is better to recommend what they already own, but if a sales manager is talking to a customer 2 years after a sale, the scoring for this component may be different and may promote other scenarios with updated features).

Each score is further computed at an employee group by employee group level. In some implementations, there may be an option to define other groups such as a project team with a defined set of employees.

This produces a 1-n list of scenarios. Scenarios above a certain threshold are shown to the user of the recommendation portal. Since each scenario has associated description and user instruction, the user may explore what it means to leverage the services in the product and/or get trained on how to do their job differently.

It will be appreciated that the above embodiments have been described by way of example only.

More generally, according to one aspect disclosed herein, there is provided a system for increasing utilization of a computer program product having a plurality of features usable by a plurality of user groups, each of said user groups being an organisation or a department within an organisation, the system comprising: memory comprising one or more memory units, said memory storing code; processing apparatus comprising one or more processing units, said processing apparatus being arranged to run said code; a database storing a set of scenarios each defining a course of action characterised by usage of a respective subset of said features; and a network interface for forming a connection between the processing apparatus and computing apparatus of each of the plurality of user groups; wherein the code is configured so as when run on the processing apparatus to perform operations of: via said network interface, receiving logs of past usage of some or all of said features by a target user group from amongst the plurality of user groups; based on the received logs, identifying one or more of said features that are unused or less frequently used by the target user group, and selecting one or more of said scenarios for the target user group which make use of the one or more unused or less frequently features; and via said network interface, outputting to the target user group an indication of the one or more selected scenarios, and thereby causing the target user group to follow the course of action defined in at least one of the one or more selected scenarios.

In embodiments, said logs may comprise logs of the past usage of said some or all of the features by each of a plurality of individual users within the target user group, and the code may be configured so as when run on the processing apparatus to aggregate the logs of the plurality of individual users and to perform said identification based on the aggregated logs.

In embodiments, said one or more selected scenarios may be a plurality of scenarios.

In embodiments, the code may be configured so as when run on the processing apparatus to determine a respective relevance score measuring a relevance to the target user group for each respective one of some or all of the scenarios in said database, and one or both of: to select whether to include each of the respective scenarios in said plurality of selected scenarios in dependence on the respective relevance score, the respective scenario being included on condition that the respective relevance score exceeds a predetermined threshold; and/or to output said indication of the plurality of selected scenarios to the target user group in a form sorted according to the relevance scores.

In embodiments, the code may be configured so as when run on the processing apparatus to: receive a profile of each of some or all of said plurality of user groups including the target user group; in addition to the logs received for the target user group, receive logs of past usage of one or more of the scenarios in said database, or of one or more of the features of said scenarios, by at least some others of the said plurality of user groups for whom a profile is received; determine a measure of similarity between the profile of the target user group and the profile of each of one or more of said other entities for whom said logs are received; and perform said selection in dependence on a combination of the past usage by said one or more other user groups and on the measure of similarity between the target user group and said one or more other user groups.

In embodiments, each of the set of scenarios may be categorised into a respective category, and the code may be configured so as when run on the processing apparatus to: determine a measure of relevance between the profile of the target user group and the of the respective category of each of the scenarios; wherein said sorting is further dependent on the relevance between the profile of the target user group and each of the relevant category of each of the scenarios.

In embodiments, the code may be configured so as when run on the processing apparatus to: receive a profile of each of some or all of said plurality of user groups including the target user group; in addition to the logs received for the target user group, receive logs of past usage of one or more of the scenarios in said database, or of one or more of the features of said scenarios, by at least some others of the said plurality of user groups for whom a profile is received; determine a measure of similarity between the profile of the target user group and the profile of each of one or more of said other user groups for whom said logs are received; and perform the determination of each of said relevance scores based on the measure of similarity between the target user group and said one or more of the other user groups.

In embodiments, the code may be configured so as when run on the processing apparatus to perform the determination of said relevance scores based on a combination of the past usage by said one or more other user groups and the measure of similarity between the target user group and said one or more other user groups.

In embodiments, the code may be configured so as when run on the processing apparatus to obtain each of the profiles from social media and/or one or more websites.

In embodiments, the code may be configured so as when run on the processing apparatus to obtain each of the profiles from social media, and/or from one or more websites, and/or from the respective user groups.

In embodiments, the code may be configured so as when run on the processing apparatus to look up a weighting assigned to each of at least some of said scenarios by an administrator of said system, and to perform said selection in dependence on the weightings.

In embodiments, the code may be configured so as when run on the processing apparatus to look up a weighting assigned to each of at least some of said scenarios by an administrator of said system and to perform the determination of said relevance scores in dependence on the weightings.

In embodiments, the code may be configured so as when run on the processing apparatus to perform said selection in dependence on whether, for each of at least some of the features of the scenarios in said database, the target user group already has access to the features or instead requires an upgrade to the computer program product to access the features.

In embodiments, the code may be configured so as when run on the processing apparatus to perform the determination of said relevance score in dependence on whether, for each of at least some of the features of the scenarios in said database, the target user group already has access to the features or instead requires an upgrade to the computer program product to access the features.

In embodiments, the code may be configured so as when run on the processing apparatus to determine an amount of time the target user group has been using the computer program product, and if the target user group has been using the computer program product for longer than a threshold period to give a greater weighting in said selection to selecting to scenarios making use of features for which the user group requires an upgrade to access, but if the target user group has been using the computer program product for longer than a threshold period to give a greater weighting in said selection to selecting scenarios making use of features to which the user group already has access.

In embodiments, the code may be configured so as when run on the processing apparatus to determine an amount of time the target user group has been using the computer program product, and if the target user group has been using the computer program product for longer than a threshold period to give a greater weighting in determining said score to scenarios making use of features for which the user group requires an upgrade to access, but if the target user group has been using the computer program product for longer than a threshold period to give a greater weighting in determining said score to scenarios making use of features to which the user group already has access.

In embodiments, each of the features in the received logs may be identified by means of a feature identity code from amongst a scheme of feature identity codes common to said computer program product and a plurality of further computer programs.

In embodiments, at least part of the logs may comprise logs of past usage of one or more of the features involving one of more vehicle tracking systems, factory sensor devices, and/or other Internet of Things (IoT) devices.

According to another aspect disclosed herein, there is provided a method of increasing utilization of a computer program product having a plurality of features usable by a plurality of user groups, each of the user groups being an organization or a department within an organization, the method comprising: accessing a database storing a set of scenarios each defining a course of action characterised by usage of a respective subset of said features; via a network interface, receiving logs of past usage of some or all of said features by a target user group from amongst the plurality of user groups; based on the received logs, identifying one or more of said features that are unused or less frequently used by the target user group, and selecting one or more of said scenarios for the target user group which make use of the one or more unused or less frequently features; and via a network interface, outputting to the target user group an indication of the one or more selected scenarios, and thereby causing the target user group to follow the course of action defined in at least one of the one or more selected scenarios.

In embodiments, the method may further comprise operations corresponding to any of the system features described herein.

According to another aspect disclosed herein, there is provided computer-readable storage storing code for increasing utilization of an associated computer program product having a plurality of features usable by a plurality of user groups, each of the user groups being an organization or a department within an organization, the code being configured so as when run on a processing apparatus to perform operations of: accessing a database storing a set of scenarios each defining a course of action characterised by usage of a respective subset of said features; via a network interface, receiving logs of past usage of some or all of said features by a target user group from amongst the plurality of user groups; based on the received logs, identifying one or more of said features that are unused or less frequently used by the target user group, and selecting one or more of said scenarios for the target user group which make use of the one or more unused or less frequently features; and via a network interface, outputting to the target user group an indication of the one or more selected scenarios, and thereby causing the target user group to follow the course of action defined in at least one of the one or more selected scenarios.

In embodiments, the software may be further configured to perform operations in accordance with any of the system features disclosed herein.

Other variants and/or applications of the disclosed techniques may become apparent to a skilled person once given the disclosure herein. The scope of the present disclosure is not limited by the above-described embodiments but only by the accompanying claims.

The invention claimed is:

1. A system for increasing utilization of a computer program product having a plurality of features usable by a plurality of user groups, each of said user groups being an organization or a department within an organization, the system comprising:
   memory comprising one or more memory units, said memory storing code;
   a processing apparatus comprising one or more processing units, said processing apparatus being arranged to run said code;
   a database storing a set of scenarios each defining a course of action characterized by usage of a respective subset of said features; and
   a network interface for forming a connection between the processing apparatus and computing apparatus of each of the plurality of user groups;
   wherein the code is configured so as when run on the processing apparatus to cause the processing apparatus to perform operations of:
   via said network interface, receiving logs of past usage of some or all of said features by a target user group from amongst the plurality of user groups;
   determining a respective relevance score measuring a relevance to the target user group for each respective one of some or all of the scenarios in said database;
   based on the received logs, identifying one or more of said features that are unused or less frequently used by the target user group, and selecting one or more of said scenarios for the target user group which make use of the one or more unused or less frequently features, wherein the selection of the one or more of said scenarios for the target user group is based on the respective relevance score for each respective one of some or all of the scenarios in said database; and
   via said network interface, outputting to the target user group an indication of the one or more selected scenarios, and thereby causing the target user group to follow the course of action defined in at least one of the one or more selected scenarios.

2. The system of claim 1, wherein said logs comprise logs of the past usage of said some or all of the features by each of a plurality of individual users within the target user group, and the code is configured so as when run on the processing apparatus to cause the processing apparatus to aggregate the logs of the plurality of individual users and to perform said identification based on the aggregated logs.

3. The system of claim 1, wherein said one or more selected scenarios are a plurality of scenarios.

4. The system of claim 3, wherein the code is configured so as when run on the processing apparatus to cause the processing apparatus to output said indication of the plurality of selected scenarios to the target user group in a form sorted according to the relevance scores.

5. The system of claim 4, wherein the code is configured so as when run on the processing apparatus to cause the processing apparatus to:
receive a profile of each of some or all of said plurality of user groups including the target user group;
in addition to the logs received for the target user group, receive logs of past usage of one or more of the scenarios in said database, or of one or more of the features of said scenarios, by at least some others of the said plurality of user groups for whom a profile is received;
determine a measure of similarity between the profile of the target user group and the profile of each of one or more of said other entities for whom said logs are received; and
perform said selection in dependence on a combination of the past usage by said one or more other user groups and on the measure of similarity between the target user group and said one or more other user groups.

6. The system of claim 5, wherein each of the set of scenarios are categorized into a respective category, and wherein the code is configured so as when run on the processing apparatus to cause the processing apparatus to:
determine a measure of relevance between the profile of the target user group and the of the respective category of each of the scenarios;
wherein said sorting is further dependent on the relevance between the profile of the target user group and each of the relevant category of each of the scenarios.

7. The system of claim 5, wherein the code is configured so as when run on the processing apparatus to cause the processing apparatus to obtain each of the profiles from social media and/or one or more websites.

8. The system of claim 4, wherein the code is configured so as when run on the processing apparatus to cause the processing apparatus to:
receive a profile of each of some or all of said plurality of user groups including the target user group;
in addition to the logs received for the target user group, receive logs of past usage of one or more of the scenarios in said database, or of one or more of the features of said scenarios, by at least some others of the said plurality of user groups for whom a profile is received;
determine a measure of similarity between the profile of the target user group and the profile of each of one or more of said other user groups for whom said logs are received; and
perform the determination of each of said relevance scores based on the measure of similarity between the target user group and said one or more of the other user groups.

9. The system of claim 8, wherein the code is configured so as when run on the processing apparatus to cause the processing apparatus to perform the determination of said relevance scores based on a combination of the past usage by said one or more other user groups and the measure of similarity between the target user group and said one or more other user groups.

10. The system of claim 8, wherein the code is configured so as when run on the processing apparatus to cause the processing apparatus to obtain each of the profiles from social media, and/or from one or more websites, and/or from the respective user groups.

11. The system of claim 4, wherein the code is configured so as when run on the processing apparatus to cause the processing apparatus to look up a weighting assigned to each of at least some of said scenarios by an administrator of said system and to perform the determination of said relevance scores in dependence on the weightings.

12. The system of claim 11, wherein the code is configured so as when run on the processing apparatus to cause the processing apparatus to determine an amount of time the target user group has been using the computer program product, and if the target user group has been using the computer program product for longer than a threshold period to give a greater weighting in said selection to selecting to scenarios making use of features for which the user group requires an upgrade to access, but if the target user group has been using the computer program product for longer than a threshold period to give a greater weighting in said selection to selecting scenarios making use of features to which the user group already has access.

13. The system of claim 4, wherein the code is configured so as when run on the processing apparatus to cause the processing apparatus to perform the determination of said relevance score in dependence on whether, for each of at least some of the features of the scenarios in said database, the target user group already has access to the features or instead requires an upgrade to the computer program product to access the features.

14. The system of claim 13, wherein the code is configured so as when run on the processing apparatus to cause the processing apparatus to determine an amount of time the target user group has been using the computer program product, and if the target user group has been using the computer program product for longer than a threshold period to give a greater weighting in determining said score to scenarios making use of features for which the user group requires an upgrade to access, but if the target user group has been using the computer program product for longer than a threshold period to give a greater weighting in determining said score to scenarios making use of features to which the user group already has access.

15. The system of claim 3, wherein the code is configured so as when run on the processing apparatus to cause the processing apparatus to look up a weighting assigned to each of at least some of said scenarios by an administrator of said system, and to perform said selection in dependence on the weightings.

16. The system of claim 3, wherein the code is configured so as when run on the processing apparatus to cause the processing apparatus to perform said selection in dependence on whether, for each of at least some of the features of the scenarios in said database, the target user group already has access to the features or instead requires an upgrade to the computer program product to access the features.

17. The system of claim 1, wherein each of the features in the received logs is identified by means of a feature identity code from amongst a scheme of feature identity codes common to said computer program product and a plurality of further computer programs.

18. The system of claim 1, wherein at least part of the logs comprise logs of past usage of one or more of the features involving one of more vehicle tracking systems, factory sensor devices, and/or other Internet of Things devices.

19. A method of increasing utilization of a computer program product having a plurality of features usable by a plurality of user groups, each of the user groups being an organization or a department within an organization, the method comprising:

accessing a database storing a set of scenarios each defining a course of action characterized by usage of a respective subset of said features;

via a network interface, receiving logs of past usage of some or all of said features by a target user group from amongst the plurality of user groups;

determines a respective relevance score measuring a relevance to the target user group for each respective one of some or all of the scenarios in said database;

based on the received logs, identifying one or more of said features that are unused or less frequently used by the target user group, and selecting one or more of said scenarios for the target user group which make use of the one or more unused or less frequently features; and via a network interface, outputting to the target user group an indication of the one or more selected scenarios, wherein the indication of the one or more selected scenarios is outputted in a form sorted according to the respective relevance score of the one or more selected scenarios, and thereby causing the target user group to follow the course of action defined in at least one of the one or more selected scenarios.

20. A non-transitory computer-readable storage storing code for increasing utilization of an associated computer program product having a plurality of features usable by a plurality of user groups, each of the user groups being an organization or a department within an organization, the code being configured so as when run on a processing apparatus to cause the processing application to perform operations of:

accessing a database storing a set of scenarios each defining a course of action characterized by usage of a respective subset of said features;

via a network interface, receiving logs of past usage of some or all of said features by a target user group from amongst the plurality of user groups;

looking up a weighting assigned to each one of some or all of the scenarios in said database;

based on the received logs, identifying one or more of said features that are unused or less frequently used by the target user group, and selecting one or more of said scenarios for the target user group which make use of the one or more unused or less frequently features, wherein the selection of the one or more of said scenarios for the target user group is based on the weighting assigned to each one of some or all of the scenarios in said database; and via a network interface, outputting to the target user group an indication of the one or more selected scenarios, and thereby causing the target user group to follow the course of action defined in at least one of the one or more selected scenarios.

* * * * *